(12) United States Patent
Rameshni

(10) Patent No.: US 7,485,281 B2
(45) Date of Patent: Feb. 3, 2009

(54) PROCESS FOR THE PRODUCTION OF SULFUR FROM SULFUR DIOXIDE

(75) Inventor: Mahin Rameshni, Monrovia, CA (US)

(73) Assignee: Worleyparsons Group, Inc., Arcadia, CA (US)

( * ) Notice: Subject to any disclaimer, the term of this patent is extended or adjusted under 35 U.S.C. 154(b) by 315 days.

(21) Appl. No.: 11/451,891

(22) Filed: Jun. 13, 2006

(65) Prior Publication Data
US 2006/0288919 A1    Dec. 28, 2006

Related U.S. Application Data

(60) Provisional application No. 60/759,805, filed on Jan. 17, 2006, provisional application No. 60/690,174, filed on Jun. 13, 2005.

(51) Int. Cl.
*C01B 17/04* (2006.01)
(52) U.S. Cl. .................. 423/563; 423/564; 423/574.1; 423/576
(58) Field of Classification Search .......... 423/563, 423/564, 574.1, 576
See application file for complete search history.

(56) References Cited

U.S. PATENT DOCUMENTS

| | | | |
|---|---|---|---|
| 3,199,955 A | | 8/1965 | West et al. |
| 3,961,035 A | | 6/1976 | Mickley |
| 4,094,961 A | * | 6/1978 | Beavon ............... 423/564 |
| 4,146,580 A | * | 3/1979 | Beavon ............... 423/564 |
| 4,404,180 A | | 9/1983 | Drum et al. |

FOREIGN PATENT DOCUMENTS

GB     1244905 A    9/1971

OTHER PUBLICATIONS

Rameshmi, M., et al: "Production of Elemental Sulphur from SO2 (RSR)" World of Metallurgy—Erzmetall, GDMB—Medienvelag, Claustal-Sellerfeld, DE, vol. 59, No. 3, May 2006, pp. 162-167.
Nelson, S. G.: "Elemental Sulfur Production from SO2-Rich Gases" Coal Science & Technology. Proceedings of the 5th International Conferecne on Processing & Utilization of High-Sulfur Coals, Amsterdam, NL, Jan. 1993, pp. 543-554.

* cited by examiner

*Primary Examiner*—Timothy C Vanoy
(74) *Attorney, Agent, or Firm*—Locke Lord Bissell & Liddell LLP

(57) ABSTRACT

The reduction of gas streams containing sulfur dioxide to elemental sulfur is carried out by contacting a reducing gas, such as natural gas, methanol or a mixture of hydrogen and carbon monoxide, with recycled sulfur to produce a stream containing hydrogen sulfide that may be reacted with the gas stream that contains sulfur dioxide. Gas streams with a molar concentration of sulfur dioxide from 1 to 100% may be processed to achieve nearly 100% sulfur recovery efficiency.

47 Claims, 3 Drawing Sheets

PROCESS FOR THE PRODUCTION OF SULFUR FROM SULFUR DIOXIDE

CROSS REFERENCE TO RELATED APPLICATIONS

This application claims the benefit under 35 U.S.C § 119(e) of U.S. Provisional Patent Application Ser. No. 60/690,174 filed Jun. 13, 2005, and U.S. Provisional Patent Application Ser. No. 60/759,805, filed Jan. 17, 2006, the contents of all of which are incorporated herein by reference for all purposes.

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

1. Field of the Invention

This disclosure relates generally to processes for the production of elemental sulfur from sulfur dioxide, and more particularly to processes for the recovery of sulfur from effluent streams containing sulfur dioxide.

2. Description of the Related Art

Sulfur dioxide is found in many industrial gases emanating from plants involved in roasting, smelting and sintering sulfide ores, or gases from power plants burning high sulfur coal or fuel oils or other sulfurous ores or other industrial operations involved in the combustion of sulfur-bearing fuels, such as fuel oil. One of the more difficult environmental problems facing industry is how to economically control $SO_2$ emissions from these sources.

Several processes schemes have been developed to recover elemental sulfur from $SO_2$ streams. There are several fundamental problems common to these efforts. In particular, byproduct formation of $H_2S$, $CS_2$, COS, $H_2$ and CO reduces sulfur recovery and fuel efficiency and requires larger equipment because of the increased gas flow. Soot formation reduces the quality of the sulfur product and fouls the equipment and catalyst beds reducing the reliability of the unit.

The thermal reduction of $SO_2$ to Sulfur was developed during 1909-11, S. W. Young investigated reduction of $SO_2$ with methane and other hydrocarbons on a laboratory scale, (Fleming, E. P., and Fitt, T. C., High Purity Sulfur from Smelter Gases—Reduction with Natural Gas, Ind. Eng. Chem., 42, 2249-2253, November 1950). In a 1934 article, Yushkevich, and others discuss in detail the various possible reaction products from the combination of $SO_2$ and a hydrocarbon reducing agent, including $H_2S$, COS, $CS_2$ and sulfur. Experiments suggested 900-1000° C. as the optimum temperature. (Yushkevich, et al., ZH. KHIM. PROM., No. 2, pp. 33-37, 1934; U.S. Pat. No. 3,928,547, entitled "Process for the Reduction of Sulfur Dioxide", Daley, W. D., Wilkalis, J. E., and Pieters, W. J. M., assigned to Allied Chemical Corp., Dec. 23, 1975). In 1938, the American Smelting and Refining Company (ASARCO) initiated investigations in this area, which soon indicated that relatively low-grade $SO_2$ might be directly converted to reasonably pure sulfur by reduction with natural gas. (Fleming, E. P., and Fitt, T. C., High Purity Sulfur from Smelter Gases—Reduction with Natural Gas, Ind. Eng. Chem., 42, 2249-2253, November 1950). Laboratory and small-scale pilot operations were gradually expanded until a semi-commercial 5-tpd unit was operated during 1940-45. Gas from copper roasters or converters containing 5-8% $SO_2$ and 9-12% oxygen was combusted with sufficient natural gas to consume all the oxygen to $CO_2$, plus additional fuel to react with an appropriate portion of the $SO_2$ according to the following overall reaction with $CH_4$ as shown in the following reaction:

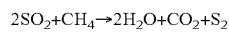

$$2SO_2 + CH_4 \rightarrow 2H_2O + CO_2 + S_2$$

Considerable quantities of byproduct $H_2S$, COS and $CS_2$ were formed as well. Furnace temperatures of at least 1250° C. were considered necessary to minimize soot, which will discolor the sulfur. The gases were then cooled and passed through a series of Claus stages for hydrolysis of COS and $CS_2$ to $H_2S$ and reaction of residual $H_2S$ and $SO_2$ to sulfur according to the Claus reaction. This process is still employed today where potential sulfuric acid supply exceeds demand. In 1978, Davy Power gas GmbH proposed a staged combustion process where hydrocarbon gas is burned at near stoichiometric conditions, followed by injection of supplemental $CH_4$ and $SO_2$ which react to form elemental sulfur. (U.S. Pat. No. 4,117,100, Hellmer, L., Koller, G., Muddarris, G. R. A., and Sud, K. K., Process for Reduction of Sulfur Dioxide to Sulfur, Davy Powergas GmbH, Sep. 26, 1978). It is also claimed that the presence of water vapor in the $SO_2$ feed stream suppresses soot formation. The process was never commercialized.

Catalytic Reduction of $SO_2$ to Sulfur was considered in a 1934, when United Verde Copper Company proposed a process where a portion of the $SO_2$ stream is combined with $CH_4$ at 800-850° C. in the presence of a metal sulphide catalyst to produce $H_2S$, which is subsequently reacted with the remaining $SO_2$ to yield sulfur according to the Claus reaction. (U.S. Pat. No. 1,967,263, Rosenstein, L., entitled "Recovery of Sulfur", United Verde Copper Company, Jul. 24, 1934). The Claus stage was described to comprise a bed of granular absorbent, such as bauxite or charcoal, continually wetted by a thin film of liquid water which served to absorb the reaction heat and also carry away the product sulfur for subsequent recovery by filtration or sedimentation. The process was never commercialized. In 1965, Texas Gulf Sulfur patented the reduction of $SO_2$ with hydrocarbons (e.g.: $CH_4$) at 750-1000° C. using a catalyst such as alumina, initially achieving 40-60% sulfur recovery (U.S. Pat. No. 3,199,955, West, J. R., and Conroy, E. H., entitled "Process of Reducing Sulfur Dioxide to Elemental Sulfur", Aug. 10, 1965). Two similar catalytic stages typically followed, whereby the second stage achieved at 390° C., with the sequence of hydrolysis of byproduct COS and $CS_2$ to $H_2S$, Claus reaction of $H_2S$ and $SO_2$ to form sulfur and reduction of $SO_2$ by CO and $H_2$ to sulfur. Claus reaction of residual $H_2S$ and $SO_2$ further proceeded in the third stage for 95% overall sulfur recovery. No method of controlling the heat release from the reduction reactions is described and the process was never commercialized.

In 1975, Allied Chemical Corp. claimed to have discovered that, at $SO_2$ concentrations on the order of 50% and higher, a small amount of elemental sulfur (0.1-3 mol-% of the feed gas as $S_8$) lowered the initiation temperature for $SO_2$ reduction and favorably moderated the temperature rise and rate. The sulfur also expedited the reaction and minimized byproduct $H_2$, CO, COS and $CS_2$ formation, (U.S. Pat. No. 3,928,547, entitled "Process for the Reduction of Sulfur Dioxide", Daley, W. D., Wilkalis, J. E., and Pieters, W. J. M., assigned to Allied Chemical Corp., Dec. 23, 1975). Generation of $H_2$ and CO is particularly counterproductive because it decreases sulfur recovery and fuel efficiency and requires larger equipment because of the increased tail gas volume. In 1977, Allied Chemical presented a 3-bed arrangement that was claimed to optimize reactant concentrations and temperatures, (U.S. Pat. No. 4,039,650, Daley, W. D., entitled "Sulfur Dioxide Reduction", Allied Chemical Corp., Aug. 2, 1977). The total $SO_2$ stream is reported to be mixed with a portion of the $CH_4$ and passed through the first reactor to effect reduction of a portion of the $SO_2$ to $H_2S$ and sulfur. Exit gas from the first reactor is mixed with the remaining $CH_4$, and the resultant mixture split into two gas streams which are then passed, in parallel, through a second and third reactor to further effect reduction of $SO_2$ to $H_2S$ and sulfur. Periodically, the flow in the first and third reactors is reversed to subject them to alternating heat absorbing and desorbing cycles (while the second reactor is always maintained in the same direction). Inlet gas temperatures to the second and third reactors are maintained within desired ranges by bypassing a portion of the $SO_2$ and $CH_4$ around the first reactor. A 25-tpd pilot plant was constructed in 1978 at a 115-MW coal-fired power plant.

The catalytic reduction of sulfur to intermediate $H_2S$ was also considered. Early research on the recovery of sulfur from gypsum ($CaSO_4 \cdot 2H_2O$) involved reduction roasting of gypsum with coal or natural gas to form calcium sulfide, which was subsequently processed to generate $H_2S$. In the laboratory, elemental sulfur was then produced by reacting $H_2S$ with $SO_2$ at ambient temperature in a liquid medium. That latter concept led the Federal Bureau of Mines, beginning in 1968, to consider absorption of $SO_2$ (from nonferrous smelters) in a liquid medium subsequently regenerated with $H_2S$ to precipitate sulfur. After screening many reagents, an aqueous solution of citric acid neutralized with soda ash to a pH of 4.5 was selected, (Crocker, L., Martin, D. A., and Nissen, W. I., "Citrate-Process Pilot-Plant Operation at the Bunker Hill Company", Bureau of Mines Report of Investigations 8374, p. 1-6, 1979). At least three pilot plants were operated during 1971-76. The most recent was located at the Bunker Hill Co.'s lead smelter in Kellogg, Id. In the absence of an external source, $H_2S$ was generated by the reaction of natural gas with sulfur vapor at 650° C. over a proprietary catalyst as shown in the following reaction:

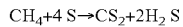
$$CH_4 + 4 S \rightarrow CS_2 + 2H_2S$$

The product $CS_2$ was subsequently hydrolyzed with steam in a second catalytic stage at 315° C. as shown in the following reaction:

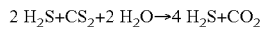
$$2 H_2S + CS_2 + 2 H_2O \rightarrow 4 H_2S + CO_2$$

The so-called "Citrate Process" for the Claus reaction of $H_2S$ and $SO_2$ within a liquid absorbent was ultimately abandoned due to absorber corrosion and plugging problems. (Kohl, A. L., and Nielsen, R. B., *Gas Purification, Fifth Edition*, p. 564, Gulf Publishing Co., 1997).

During 1978-1980, a series of three U.S. patents by D. K. Beavon, as described below, proposed innovations to reduce equipment costs and improve operability and product quality. A common theme was the efficient reduction of recycled sulfur to $H_2S$ for subsequent reaction with $SO_2$ to produce sulfur, while minimizing the soot formation characteristic of direct $SO_2$ reduction. Sulfur reduction by submerged hydrocarbon combustion was described in a 1978 patent, wherein $H_2$ and CO are initially formed in a reducing gas generator by the partial combustion of a hydrocarbon fuel, with steam injection to suppress soot formation. The fuel can be gaseous (such as methane), liquid (such as kerosene, diesel or other fuel oil) or solid (such as coal or coke), (U.S. Pat. No. 4,094,961, Beavon, D. K., entitled "Hydrogen Sulfide Production", Ralph M. Parsons Company, Jun. 13, 1978).

The reducing gas is reportedly then sparged through molten sulfur, so that combustion temperatures are rapidly quenched by sulfur vaporization. The firing rate is adjusted to produce a 250-450° C. vapor stream with a nominal stoichiometric excess of hydrogen, which is then passed across a fixed cobalt-moly catalyst bed. Elemental sulfur is hydrogenated to $H_2S$. Byproduct COS and $CS_2$ are hydrolyzed to $H_2S$, and CO is hydrolyzed to $CO_2$ and $H_2$. Sufficient reaction heat is generated that multiple beds with inter-stage cooling are typically required. Reactor effluent is cooled in the sulfur cooler to condense any residual sulfur vapor, particularly during non-routine operation, while remaining above the water dew point. The gas is then further cooled to condense most of the water vapor, yielding an $H_2S$-rich stream that can then be reacted with $SO_2$ in a conventional Claus reactor to produce elemental sulfur. The process has not been commercialized. The reduction of sulfur in a reaction furnace was described in a 1979 patent, wherein hydrogen and CO are similarly generated by partial oxidation of a hydrocarbon, gaseous or liquid, in the first zone of a 2-zone furnace, and a stoichiometric excess of liquid sulfur is injected into the second zone to quench temperatures to 800-1100° C., (U.S. Pat. No. 4,146,580, Beavon, D. K., entitled "Process for Hydrogen Sulfide Production", Ralph M. Parsons Company, Mar. 27, 1979).

A portion of the $H_2$ and CO react with the sulfur to form $H_2S$, COS and some $CS_2$, with about 50% of the total $H_2S$ production being achieved in the furnace. The resultant vapor stream is rapidly cooled to 425° C. or less in a waste heat boiler to suppress further formation of undesirable organic sulfur byproducts. The stream is then further cooled to condense and remove most of the residual sulfur. The gas stream is then typically reheated for conventional catalytic hydrogenation of sulfur and $SO_2$ to $H_2S$, hydrolysis of COS and $CS_2$ to $H_2S$ and hydrolysis of CO to $CO_2$ and hydrogen. The reactor effluent is then cooled by conventional means to ultimately condense most of the water vapor, yielding an $H_2S$-rich gas stream that can be subsequently reacted with $SO_2$ in a conventional Claus reactor to yield elemental sulfur. As with the previous process, this process has not been commercialized.

The thermal reduction of $SO_2$ was developed in a 1980 patent, wherein a hydrocarbon fuel, gaseous or liquid, is partially oxidized in a reaction furnace to generate $H_2$ and CO. Sulfur dioxide ($SO_2$) added to the thermal reaction zone to react with the $H_2$ and indirectly, CO (by virtue of water gas shift to $CO_2$ and $H_2$). The firing rate was adjusted to yield a mixture of $H_2S$ and $SO_2$ in the molar ratio of 2:1 as required by Claus stoichiometry (U.S. Pat. No. 4,207,304, Beavon, D. K., entitled "Process for Sulfur Production", Ralph M. Parsons Company, Jun. 10, 1980).

Competing reactions in this process are the formation of COS and $CS_2$ from the reaction of CO and free carbon with $SO_2$ and sulfur. Potential soot may be washed from the system by the introduction of liquid sulfur, which is recycled to enable consumption of extracted carbon. The resultant vapor stream is rapidly cooled to 425° C. or less to suppress further formation of undesirable organic sulfur byproducts. Elemental sulfur can be recovered and recycled to the reactor for gasification of extracted carbon solids and tars.

Further sulfur recovery is achieved as the process gas proceeds through a series of conventional catalytic Claus stages.

This application for patent discloses processes for the production of elemental sulfur from sulfur dioxide.

BRIEF SUMMARY OF THE INVENTION

The present invention relates to a process for recovering sulfur from sulfur dioxide ($SO_2$) containing gases. Key advantages are lower fuel consumption, reduced emissions, better product sulfur quality and better operational stability.

In accordance with aspects of the present invention, a reducing gas, for example a hydrocarbon such as methane, methanol, or a $H_2$ and CO mixture, is contacted with elemental sulfur to produce a reducing gas that contains hydrogen sulfide. The $H_2S$ containing reducing gas is then contacted with a stream that contains $SO_2$ to produce elemental sulfur, a portion of which may be recycled back to the fist step of the process.

In accordance with further aspects of the present invention, processes for the production of sulfur from sulfur dioxide (SO2)-containing effluent streams are described, wherein the processes comprise contacting a reducing agent with elemental sulfur at a first elevated temperature in a heater for a period of time sufficient to produce a reducing gas effluent stream comprising hydrogen sulfide; contacting the reducing gas with a sulfur dioxide-containing stream to generate a feed gas mixture stream; contacting the feed gas mixture stream with an activated catalyst in a reaction zone at a temperature effective for the reaction between hydrogen sulfide and sulfur dioxide to generate a product gas stream comprising elemental sulfur and water; and, recovering the elemental sulfur from the product gas stream.

In accordance with another aspect of the present invention, a process for converting sulfur dioxide is described, wherein the process comprises introducing a reducing agent into a heater; introducing elemental sulfur into a heater; contacting the reducing agent and the elemental sulfur in a first reactor at a temperature ranging from about 600° C. to about 1000° C. for a period of time sufficient to form a reducing gas effluent stream comprising $H_2S$, COS, or $CS_2$; contacting the reducing gas with a sulfur dioxide-containing effluent stream in a second reactor at an elevated temperature for a time sufficient to form a product gas stream comprising elemental sulfur; and, cooling the product gas stream in one or more sulfur condensers to condense and recover elemental sulfur.

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

Figure 1:
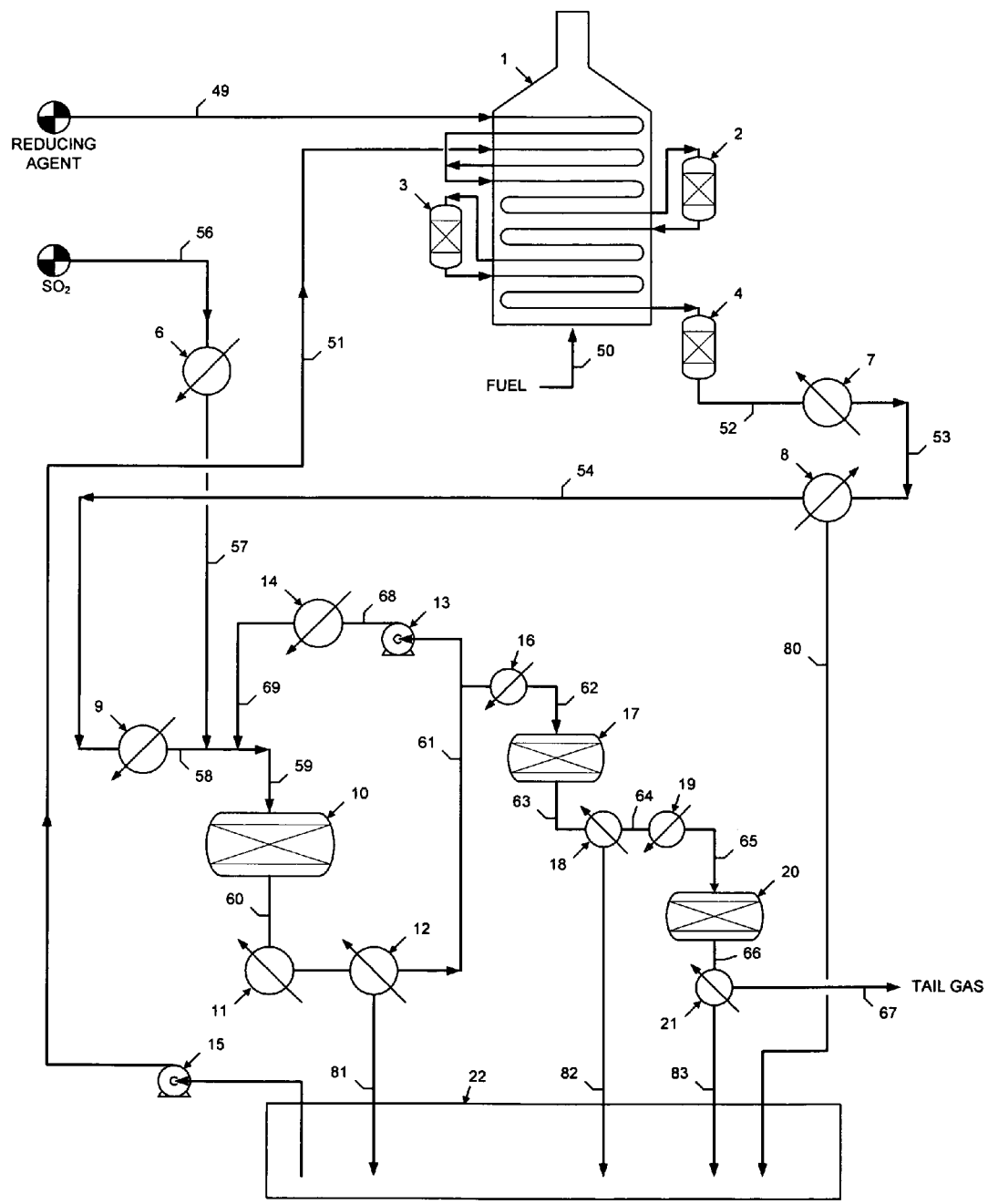
FIG. 1 illustrates a schematic diagram of an embodiment of the present invention.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes converting sulfur-dioxide and sulfur-dioxide-containing effluents into elemental sulfur.

In the discussion of the Figures, the same or similar numbers will be used throughout to refer to the same or similar components. Not all valves and the like necessary for the performance of the process have been shown in the interest of conciseness.

In FIG. 1, a reducing agent (49) comprising a hydrocarbon, methanol, a hydrogen and carbon monoxide mixture, or mixtures thereof, and liquid sulfur (51) are separately preheated to a temperature from about 500° C. (932° F.) to about 650° C. (1200° F.), at a pressure of about 72 psig (about 500 kPag), in an $H_2S$ generator (1). If a hydrocarbon is employed as reducing agent (49), or as a part of a reducing agent mixture, the hydrocarbon reducing agent may be selected from the group consisting of alkanes, alkenes, alkynes, cycloalkanes, aromatic hydrocarbons, and mixtures thereof.

In reference to reducing agent (49), and as used herein, the term hydrocarbon is meant to refer to those organic compounds (both saturated and unsaturated) composed solely of the elements hydrogen and carbon. Suitable hydrocarbon reducing agents for use herein include but are not limited to alkanes of the general formula $C_nH_{2n+2}$ (wherein 'n' is an integer greater than or equal to 1), such as methane, ethane, propane, n-octane, and the like, as well as mixtures of alkanes; alkenes of the general formula $C_nH_{2n}$ (wherein 'n' is an integer greater than or equal to 1), including 1-butene and 1-propene, and mixtures of alkenes; alkynes of the general formula $C_nH_{2n-2}$ (wherein 'n' is an integer greater than or equal to 1), and mixtures of alkynes; cycloalkanes of the general formula $C_nH_{2n}$ (wherein 'n' is an integer greater than or equal to 1), including cyclohexane and other "naphthenes", as well as mixtures thereof; aromatic compounds of the general formula $C_nH_{2n-6}$, including both monocyclic (benzene) and polycyclic (napthene) aromatics; as well as mixtures of the above described hydrocarbons. Suitable reducing agents can also be formed by the combustion of a hydrocarbon in the presence of an amount of oxygen insufficient for the complete oxidation of the hydrocarbon.

The $H_2S$ reactor (1) may be any suitable heater, externally-fired heater, furnace, reactor or generator, such as those externally fired systems commonly used in ethylene cracking operations or $CS_2$ production. Fuel (50) may be combusted in the $H_2S$ generator to provide heat. Fuel (50) may be any suitable fuel, including, but not limited to, gaseous fuels (such as methane or propane), liquid fuels (such as kerosene, diesel, or other fuel oil), solid fuels (such as coal or coke), or combinations thereof. In a preferred embodiment of the reactor, heat transfer to the transfer coils occurs primarily by radiation with little or no direct contact of the flame. The reducing agent and sulfur react at a temperature in the range of about 600° C. (1110° F.) to about 1832° C. (3300° F.). The tubes are typically constructed of a high nickel-chrome alloy.

The liquid sulfur boils at about 445° C. (833° F.), and vaporizes at about 450° C. (840° F.), at which temperature it exists mainly as orthorhombic sulfur ($S_8$). Subsequent superheating to a temperature ranging from about 500° C. to about 650° C. (about 930° F. to about 1200° F.) results in endothermic decomposition to smaller, more reactive, species (e.g., $S_6$ and $S_2$). This dissociation is also favored by the reduction in partial pressure of the sulfur vapor as $H_2S$ and $CS_2$ are formed in the reactor. Consequently, it is desirable to preheat the vapor to the maximum reaction temperature before combination with the reducing agent, to minimize the reactor temperature drop resulting from the endothermic dissociation of the sulfur. The reducing agent and sulfur vapor are then contacted and mixed. The amount of reducing agent fed to the unit may be controlled to maintain the mole ratio of $H_2S$ to $SO_2$ in the tail gas stream (67). It is presently preferred that the $H_2S$ to $SO_2$ mole ratio be controlled so as to be in a range from about 2:1 and about 5:1.

The combined stream flows through a radiantly heated pipe coil, where the reaction between the reducing agent and sulfur proceeds. The primary reactions that may occur are:

$$CH_4 + 2\ S_2 \rightarrow CS_2 + 2\ H_2S$$

$$2\ CH_3OH + 2\ S_2 \rightarrow 2\ COS + 2\ H_2S$$

$$2\ H_2 + S_2 \rightarrow 2\ H_2S$$

$$2\ CO + S_2 \rightarrow 2\ COS$$

The reactions between the reducing agent and the sulfur may be further completed in one or more $H_2S$ generator reactors (2, 3, 4) that contain fixed catalyst beds. The catalyst may be any of the catalysts commonly used in $CS_2$ production plants, for example, activated alumina ($Al_2O_3$) or silica gel.

In accordance with aspects of the present invention, the catalysts suitable for use with the processes described herein comprise those containing one or more metals or combinations of metals of Group 4, Group 5, Group 6, Group 8, Group 9, Group 10, Group 14, Group 15 and the Rare Earth series (Group 3 elements and the lanthanides) of the Periodic Table, as described and referenced in "Advanced Inorganic Chemistry, 6$^{th}$ Ed." by F. A. Cotton, et al. [Wiley-Interscience, (1999)], any of which can be present on a suitable, conventional inorganic support material. The preferred catalysts for use with the processes described herein include, but are not limited to, those containing one or more of the metals selected from the group consisting of cobalt, titanium, iron, chromium, vanadium, nickel, tungsten, germanium, zinc, cerium, and antimony, as well as combinations of two or more of these metals, such as in cobalt-molybdate catalysts. In accordance with one aspect of the present invention, the catalyst comprises titanium. In the event that the catalyst used in the processes of the present disclosure is a mixture of two metals, the ratio (on an atomic basis) of these metals is preferably between about 10:90 and 97.5:2.5, and more particularly ranges from about 25:75 to about 95:5, including ratios between these values, such as about 50:50.

Suitable supports for use in accordance with the catalysts and catalyst systems useful with the present inventions include ceramic materials, sintered metals, oxides, activated alumina or alumina-based materials, and silica gel, as well as mixtures thereof, such as alumina mixed with one or more other oxides. Suitable oxides include silica, titanium oxide, zirconium oxide, cerium oxide, tin oxide, trivalent rare-earth oxides, molybdenum oxide, cobalt oxide, nickel oxide, iron oxide, and the like. Activated alumina or alumina-based materials suitable for use herein include but are not limited to hydrated alumina compounds such as hydrargillite, bayerite, boehmite, pseudoboehmite, and amorphous or substantially amorphous alumina gels. Exemplary alumina and alumina-based materials can include aluminas which contain at least one of the phases taken from the group consisting of alpha, beta, delta, theta, kappa, gamma, eta, chi, rho, and mixtures thereof, as well as aluminas obtained by methods such as precipitation, rapid dehydration of aluminum hydroxides or oxyhydroxides, and/or calcining processes, as well as by other methods known to those of skill in the art. As indicated above, and in accordance with an aspect of the present invention, the catalysts for use with the processes of the present disclosure are those commonly used in $CS_2$ production plants, for example, activated alumina ($Al_2O_3$) or silica gel.

The reaction between the sulfur and reducing agent continues in the reactors. After the first reactor, the gas may be reheated in the $H_2S$ generator heater before entering the subsequent reactors, if any. Excess sulfur may be fed to the $H_2S$ generator to maximize conversion of the reducing agent and to minimize side reactions. It is presently preferred that the excess sulfur be fed at a rate at least 5% to 10% above the rate required for completion of the reactions.

The effluent gas (52) from the final $H_2S$ generator reactor may be cooled to condense sulfur. FIG. 1 depicts a two stage system in which the gas is cooled to about 340° C. (53) in a waste heat boiler (7) that generates high pressure 600 psig (4200 kPag) steam, then subsequently the gas (53) cools in the No. 1 Sulfur condenser (8) to about 150° C. (300° F.) by the generation of low-pressure (50 psig; 350 kPag) steam to condense most of the residual sulfur vapor, which then drains to the collection pit (22) through one or more drain lines (80). The number of coolers and cooling medium may be adjusted without affecting the process. The cooled gas stream (54) may then be reheated to about 210° C. (410° F.) in a No. 1 Reheater (9).

With continued reference to FIG. 1, a sulfur dioxide ($SO_2$) stream (56) with a molar concentration of $SO_2$ ranging from about 1% to about 100% is then introduced to the unit. The sulfur dioxide stream can come from any number of suitable $SO_2$ sources, including but not limited to tail gas streams from any number of process plants, the condensation of enriched stripper gases, tail gas effluent, and the like; from the combustion of fossil fuels; from the burning of crude oils; from the smelting of sulfide ores such as iron pyrites and sphalerite (zinc blende); and heating calcium sulfate (gypsum) with coke and sand in the manufacture of cement. In accordance with an aspect of the present invention, the $SO_2$ stream is preferably pretreated to remove particulate material and concentrate the stream to a molar concentration ranging from about 25% to about 100% before entering the unit, although removal of particulates and concentration is not necessary for operation of the presently described process. The $SO_2$ stream is heated in an $SO_2$ preheater (6) and the heated $SO_2$ stream (57) is combined with the heated $H_2S$ stream (58). The combined stream (59) enters reactor No. 1 sulfur reactor (10)

containing a fixed bed of activated catalyst, preferably an alumina or titania catalyst of the type normally employed in Claus sulfur recovery units. In the reactor, $H_2S$ and $SO_2$ react to form elemental sulfur according the following reaction:

$$2\ H_2S + SO_2 \rightarrow 3/X\ S_X + 2\ H_2O$$

Carbonyl sulfide (COS) and carbon disulfide ($CS_2$) may be concurrently hydrolyzed in the reactor to form hydrogen sulfide ($H_2S$) according the following reactions:

$$COS + H_2O \rightarrow H_2S + CO_2$$

$$CS_2 + 2\ H_2O \rightarrow 2\ H_2S + CO_2$$

FIG. 1 illustrates a two stage system in which the effluent gas stream (60) from the No. 1 Sulfur reactor (10) is cooled to about 340° C. (650° F.) in the SRU (Sulfur Recovery Unit) waste heat boiler (11) by the generation of high-pressure steam, then subsequently to about 150° C. (300° F.) by the generation of low-pressure steam in the No. 2 sulfur condenser (12) to condense most of the residual sulfur vapor, which drains to the collection header stream (81). The number of coolers and cooling medium may be adjusted without affecting the process.

When processing a concentrated $SO_2$ stream, a portion of the process gas stream (61) may be recycled to the No. 1 SRU reactor, via a low-head centrifugal recycle blower (13). The effluent from the blower (68) may be heated in the reheater recycle gas preheater (14) and the reheated stream (69) mixed with the reactor feed to dilute the reactants as necessary to limit the exothermic temperature rise.

Ultimately, the process gas stream (61) may be sent to one or more the additional reaction stages in order to increase sulfur recovery efficiency. For example, FIG. 1 illustrates a second reaction stage, comprising the No. 2 reheater (16), No. 2 sulfur reactor (17) and No. 3 sulfur condenser (18) for further reaction of residual $H_2S$ and $SO_2$ through streams (62 and 63), and liquid sulfur stream (82).

As with the first reaction stage, an alumina or titania catalyst may be used in the reactor. The reactants are sufficiently dilute at this point that tail gas recycle may not be required for temperature control, and the second and third stage reactors, if provided, may thus be considerably smaller. Similarly, FIG. 1 depicts a third reaction stage, comprising the No. 3 steam reheater (19), No. 3 sulfur reactor (20) and No. 4 sulfur condenser,(21) for further reaction of residual $H_2S$ and $SO_2$ through streams (64,65, and 66), and liquid sulfur stream (83) to the sulfur pit. The process is able to achieve an overall sulfur recovery efficiency of greater than 95% based on the theoretical amount of recoverable sulfur. For example, the sulfur recovery efficiency may be about 98% with a concentrated $SO_2$ feed stream and three reaction stages. The tail gas stream (67) may be incinerated and discharged to atmosphere or treated in any of the tail gas treating units used to treat Claus sulfur recovery unit tail gases to achieve nearly 100% sulfur recovery efficiency.

The liquid sulfur is collected in a sulfur pit (22) or other collection device and may be handled by others, or shipped, as appropriate.

Figure 2:
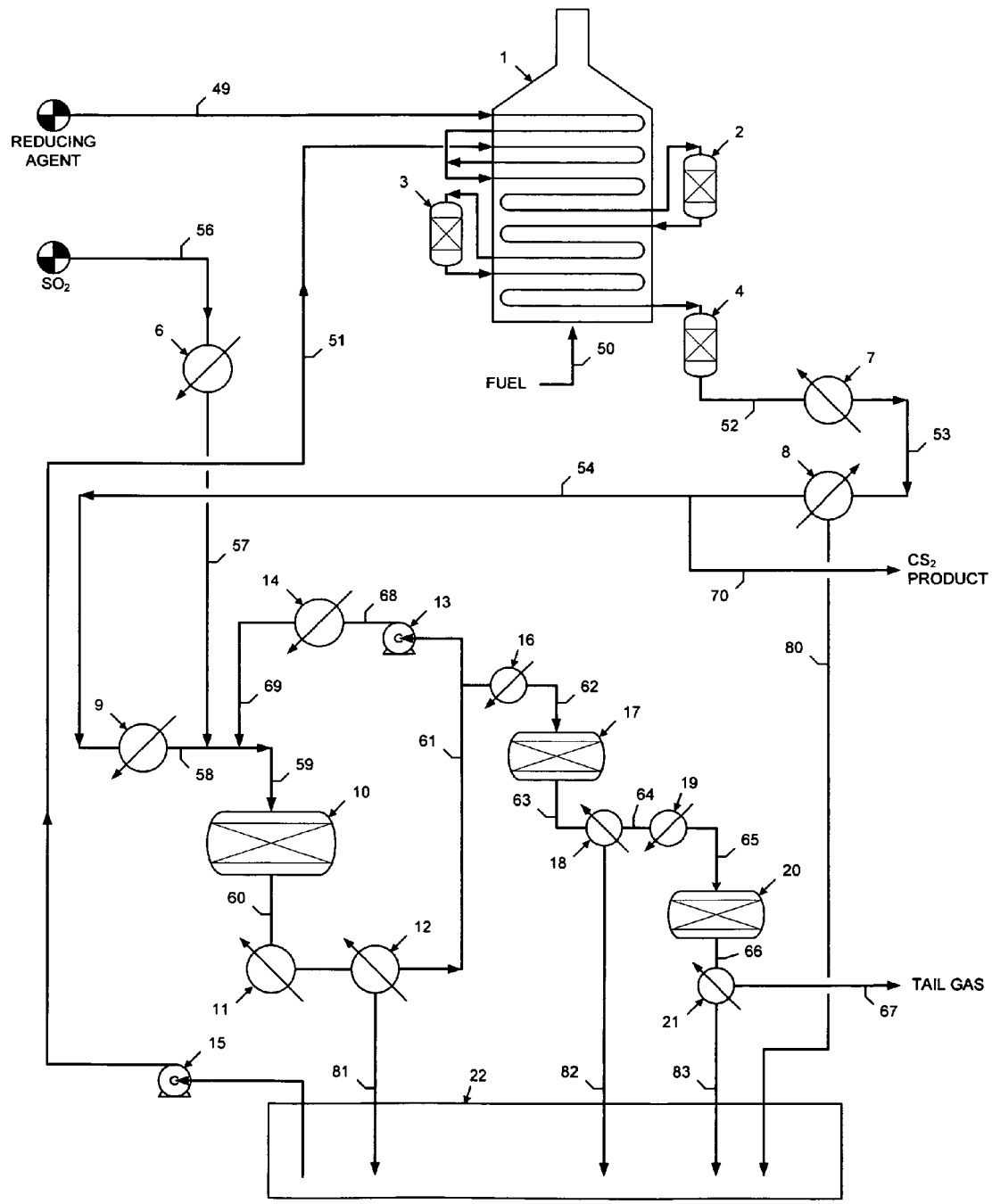
FIG. 2 illustrates a schematic diagram of an alternate embodiment of the present invention in which a $CS_2$ product is produced.

In FIG. 2, an alternate embodiment of the present invention is illustrated. In this embodiment, a $CS_2$ product (70) is separated from the $H_2S$ generator effluent stream (54). The separation of $CS_2$ may be by any of the methods typically used in $CS_2$ production plants.

Figure 3:
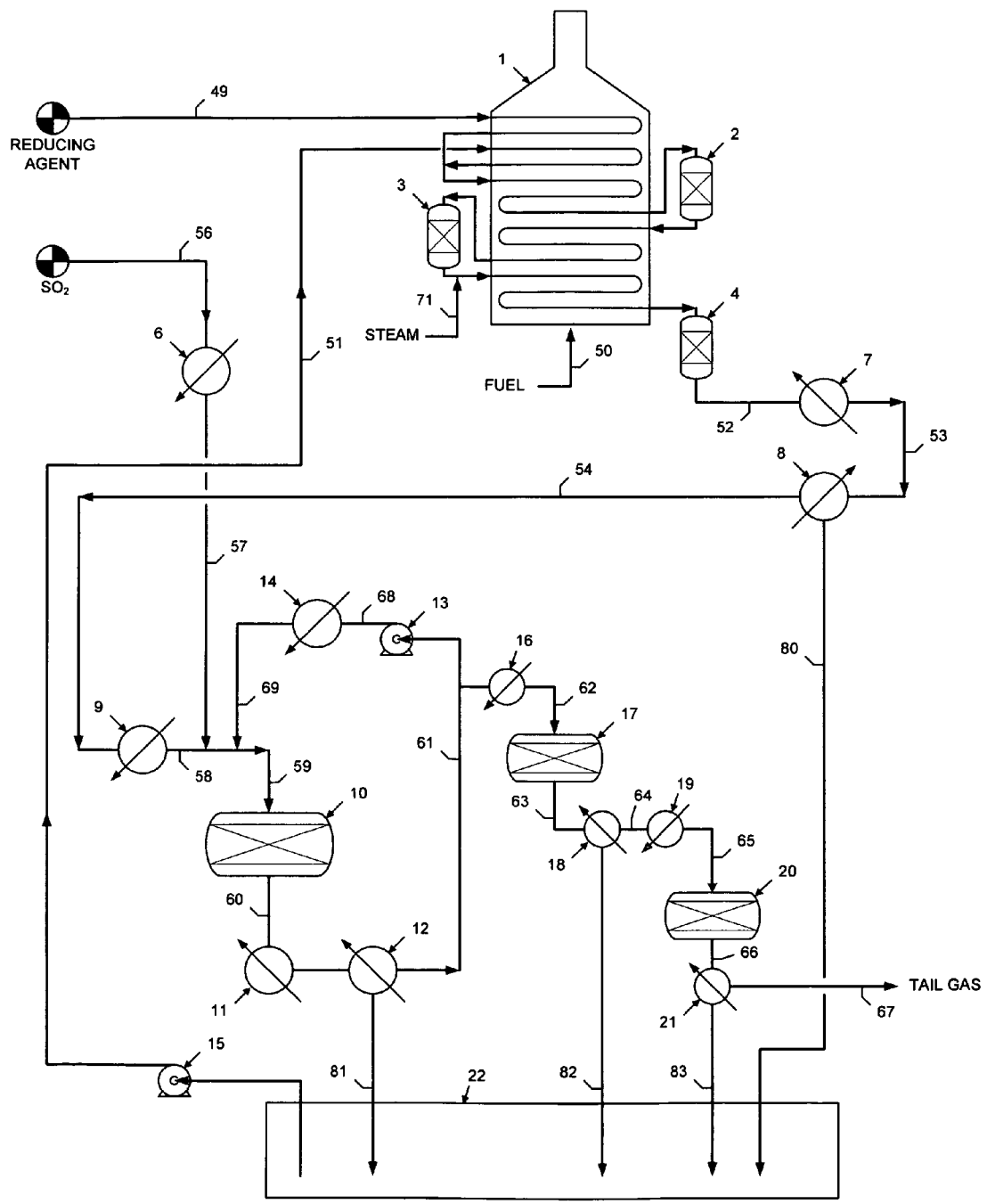
FIG. 3 illustrates a schematic diagram of an alternate embodiment of the present invention in which steam is injected.

In FIG. 3, an alternate embodiment of the invention is illustrated. In this embodiment, steam (71) is injected before the final $H_2S$ generator reactor. The steam acts to hydrolyze some or all of the COS or $CS_2$ produced in the $H_2S$ generator.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents of the following claims.

What is claimed is:

1. A process for the production of sulfur from sulfur dioxide ($SO_2$)-containing effluent streams, the process comprising:

contacting a reducing agent with elemental sulfur at a first elevated temperature in a heater for a period of time sufficient to produce a reducing gas effluent stream comprising hydrogen sulfide ($H_2S$);

contacting the reducing gas with a sulfur dioxide-containing stream to generate a feed gas mixture stream;

contacting the feed gas mixture stream with an activated catalyst in a reaction zone at a temperature effective for the reaction between hydrogen sulfide and sulfur dioxide to generate a product gas stream comprising elemental sulfur and water; and recovering the elemental sulfur from the product gas stream, wherein the elemental sulfur is preheated to a temperature ranging from about 500° C. to about 650° C. prior to contacting the elemental sulfur with the reducing agent.

2. The process of claim 1, wherein the reducing agent comprises hydrocarbons, methanol, or a mixture of carbon monoxide and hydrogen.

3. The process of claim 2, wherein the hydrocarbon reducing agent is selected from the group consisting of alkanes, alkenes, alkynes, cycloalkanes, aromatic hydrocarbons, and mixtures thereof.

4. The process of claim 1, wherein the first elevated temperature is in the range from about 600° C. to about 1832° C.

5. The process of claim 1 in which about 100% sulfur recovery efficiency is achieved.

6. The process of claim 1, wherein the reducing gas effluent stream further comprises $CS_2$.

7. The process of claim 1, further comprising contacting the reducing agent and the elemental sulfur in one or more reactors for a period of time sufficient to effect further reaction of the elemental sulfur and the reducing agent.

8. The process of claim 7, wherein the one or more reactors contain a catalyst.

9. The process of claim 8, wherein the catalyst comprises at least one metal selected from the Group 4, Group 5, Group 6, Group 8, Group 9, Group 10, Group 14, Group 15, and the Rare Earth Series of the Periodic Table on an inorganic support material.

10. The process of claim 9, wherein the catalyst comprises titanium on an alumina ($Al_2O_3$) or silica ($SiO_2$) inorganic support material.

11. The process of claim 1, wherein the sulfur dioxide-containing stream comprises $SO_2$ in a molar concentration ranging from about 1 mol % to about 100 mol %.

12. The process of claim 1, wherein the sulfur dioxide-containing effluent stream comprises $SO_2$ in a molar concentration ranging from about 25 mol % to about 100 mol %.

13. The process of claim 1, wherein the $H_2S$-containing gas is contacted with the sulfur dioxide-containing stream in an amount such that the mole ratio of hydrogen sulfide to sulfur dioxide in the gaseous-mixture reaction stream ranges from about 2:1 to about 5:1.

14. The process of claim 1, wherein the recovering process comprises cooling the product gas stream in one or more sulfur condensers to condense and recover elemental sulfur from the product gas stream.

15. The process of claim 1, further comprising removing particulate material from the sulfur dioxide-containing stream.

16. The process of claim 1, wherein the amount of elemental sulfur contacted with the reducing agent ranges from about 5 wt. % to about 10 wt. % greater than the amount of reducing agent.

17. The process of claim 1, wherein the activated catalyst in the reaction zone wherein the feed gas mixture stream comprising a reducing gas and sulfur dioxide is contacted is a fixed bed catalyst.

18. The process of claim 17, wherein the fixed bed catalyst comprises alumina or titania.

19. The process of claim 1, wherein COS and $CS_2$ are concurrently hydrolyzed in the reaction zone to form at least $H_2S$ and $CO_2$.

20. The process of claim 1, further comprising recycling a portion of the product gas stream back into the reaction zone.

21. The process of claim 1, further comprising conveying at least a portion of the product gas stream through one or more additional reaction stages, the reaction stages comprising a re-heater, a sulfur reactor, a sulfur condenser, and combinations thereof.

22. The process of claim 1 in which a portion of the produced sulfur is recycled to the $H_2S$ generator.

23. The process of claim 1, further comprising separating an amount of $CS_2$ generated in the heater so as to produce a reducing gas effluent stream comprising greater than about 70 mol. % $H_2S$.

24. The process of claim 1, wherein the amount of elemental sulfur recovered from the product gas stream is greater than about 95% based on the theoretical amount of recoverable elemental sulfur.

25. A process for converting sulfur-dioxide, the process comprising:
introducing a reducing agent into a heater;
introducing elemental sulfur into the heater;
contacting the reducing agent and the elemental sulfur in a first reactor at a temperature ranging from about 600° C. to about 1000° C. for a period of time sufficient to form a reducing gas effluent stream comprising $H_2S$, COS, or $CS_2$;
contacting the reducing gas with a sulfur dioxide-containing effluent stream in a second reactor at an elevated temperature for a time sufficient to form a product gas stream comprising elemental sulfur; and
cooling the product gas stream in one or more sulfur condensers to condense and recover elemental sulfur,
wherein the elemental sulfur is preheated to a temperature ranging from about 500° C. to about 650° C. prior to contacting the elemental sulfur with the reducing agent.

26. The process of claim 25, wherein the reducing agent comprises hydrocarbons, methanol, or a mixture of carbon monoxide and hydrogen.

27. The process of claim 26, wherein the hydrocarbon reducing agent is selected from the group consisting of alkanes, alkenes, alkynes, cycloalkanes, aromatic hydrocarbons, and mixtures thereof.

28. The process of claim 25 in which about 100% sulfur recovery efficiency is achieved.

29. The process of claim 25, wherein the amount of elemental sulfur contacted with the reducing agent ranges from about 5 wt. % to about 10 wt. % greater than the amount of reducing agent.

30. The process of claim 25, further comprising injecting steam into the first reactor for a period of time sufficient to hydrolyze a portion of any COS, $CS_2$, or both COS and $CS_2$ within the reducing gas to form at least $H_2S$.

31. The process of claim 25, further comprising contacting the reducing agent and the elemental sulfur in one or more reactors for a period of time sufficient to effect further reaction of the elemental sulfur and the reducing agent.

32. The process of claim 31, wherein the one or more reactors contain a catalyst.

33. The process of claim 32, wherein the catalyst comprises at least one metal selected from the Group 4, Group 5, Group 6, Group 8, Group 9, Group 10, Group 14, Group 15, and the Rare Earth Series of the Periodic Table on an inorganic support material.

34. The process of claim 33, wherein the catalyst comprises titanium on an alumina ($Al_2O_3$)or silica ($SiO_2$) inorganic support material.

35. The process of claim 25, wherein the recovering process comprises cooling the product gas stream in one or more sulfur condensers to condense and recover elemental sulfur from the product gas stream.

36. The process of claim 25, further comprising removing particulate material from the sulfur dioxide-containing effluent stream.

37. The process of claim 25, wherein the sulfur dioxide-containing effluent stream comprises $SO_2$ in a molar concentration ranging from about 1 mol % to about 100 mol %.

38. The process of claim 25, wherein the sulfur dioxide-containing effluent stream comprises $SO_2$ in a molar concentration ranging from about 25 mol % to about 100 mol %.

39. The process of claim 25, wherein the reducing gas is contacted with the sulfur dioxide-containing effluent stream in an amount such that the mole ratio of hydrogen sulfide to sulfur dioxide in the gaseous mixture reaction stream ranges from about 2:1 to about 5:1.

40. The process of claim 25, wherein the second reactor comprises an activated catalyst.

41. The process of claim 40, wherein the activated catalyst comprises alumina or titania.

42. The process of claim 25, wherein COS and $CS_2$ are concurrently hydrolyzed in the reaction zone to form at least $H_2S$ and $CO_2$.

43. The process of claim 25, further comprising separating an amount of $CS_2$ in the reducing gas so as to produce a reducing gas effluent stream comprising at least 70 mol % $H_2S$.

44. The process of claim 25, further comprising recycling a portion of the product gas stream comprising elemental sulfur back into the second reactor.

45. The process of claim 25, further comprising conveying at least a portion of the product gas stream through one or more additional reaction stages, the reaction stages comprising a re-heater, a sulfur reactor, a sulfur condenser, and combinations thereof.

46. The process of claim 25, wherein the amount of elemental sulfur recovered from the product gas stream is greater than about 95% based on the theoretical amount of recoverable elemental sulfur.

47. The process of claim 25 in which a portion of the produced sulfur is recycled to the $H_2S$ generator.

* * * * *